United States Patent
Al-Oriar

(10) Patent No.: US 7,617,843 B1
(45) Date of Patent: Nov. 17, 2009

(54) SPLIT SLEEVE CLAMP ASSEMBLY

(76) Inventor: Abdulaziz K. Al-Oriar, Blockio, Area 3, Street 1, House 19, Sabah Alsalem (KW)

( * ) Notice: Subject to any disclaimer, the term of this patent is extended or adjusted under 35 U.S.C. 154(b) by 0 days.

(21) Appl. No.: 12/236,875

(22) Filed: Sep. 24, 2008

(51) Int. Cl.
*F16L 55/16* (2006.01)
(52) U.S. Cl. .......................... 138/99; 138/97
(58) Field of Classification Search .................. 138/99, 138/97
See application file for complete search history.

(56) References Cited

U.S. PATENT DOCUMENTS

| | | | | | |
|---|---|---|---|---|---|
| 452,307 | A | * | 5/1891 | Lee | 138/99 |
| 631,867 | A | * | 8/1899 | Beaver | 138/99 |
| 732,400 | A | * | 6/1903 | Dresser et al. | 138/99 |
| 2,286,751 | A | * | 6/1942 | Merrill | 138/99 |
| 3,861,422 | A | * | 1/1975 | Christie | 138/99 |
| 3,954,288 | A | * | 5/1976 | Smith | 285/93 |
| 4,015,634 | A | * | 4/1977 | Christie | 138/99 |
| 4,111,234 | A | * | 9/1978 | Wells et al. | 138/99 |
| 4,756,338 | A | * | 7/1988 | Guyatt et al. | 138/99 |
| 4,889,370 | A | * | 12/1989 | Firestone | 285/342 |
| 5,345,972 | A | * | 9/1994 | Goglio et al. | 138/99 |
| 5,853,030 | A | * | 12/1998 | Walding | 138/99 |
| 6,305,719 | B1 | * | 10/2001 | Smith et al. | 285/15 |
| 6,884,373 | B1 | * | 4/2005 | Johnson et al. | 264/32 |
| 7,464,728 | B2 | * | 12/2008 | Cairns | 138/99 |

* cited by examiner

*Primary Examiner*—Patrick F. Brinson
(74) *Attorney, Agent, or Firm*—Lowe Hauptman Ham & Berner, LLP

(57) ABSTRACT

A split sleeve assembly or clamp includes a longitudinally extending body having upper and lower half sections and a cylindrically shaped chamber having two pair of C-shaped flanges that divide the chamber into three sections including two end chambers with two open ends. A pair of glands with one gland disposed at each end of the body abutting the end chambers after being filled with packing materials on each side of a leak. The assembly also includes a pair of split gland elements each of which are held together by a sealing ring for sealing the ends of the assembly. The gland elements also include an integrally formed boss for fitting into an end chamber and compressing the packing material therein. A plurality of swivable bolts disposed at each end of the assembly on the upper and lower half sections are used to tightly seal the ends of the assembly. The assembly also includes a drainage valve centrally located on the lower half section and an injection valve for injecting additional packing material into the upper half section of the assembly.

4 Claims, 5 Drawing Sheets

SPLIT SLEEVE CLAMP ASSEMBLY

FIELD OF THE INVENTION

This invention relates a split sleeve clamp assembly for repairing a leak in a fluid conducting pipe and more particularly to a split sleeve assembly that forms a clamp around a leaking pipe, forms a relatively permanent repair and in many cases avoids the necessity of shutting down a process and/or cutting through a portion of the pipe.

BACKGROUND FOR THE INVENTION

Pipe lines in power plants, petroleum refineries and other industries vary in terms of type and diameter depending on the nature of the work and the type of fluid that passes there through. Such pipe lines are frequently exposed to harsh weather and environments and often face leakage problems in vulnerable areas. As a result, fluid leaks are frequently encountered and at times require plant shut downs to correct the problems.

Numerous attempts have been made to provide clamps or the like to repair leaks in pipe lines under adverse conditions without shutting down the process.

For example, a U.S. Patent of Daspit, U.S. Pat. No. 4,096,886 discloses a clamp for repair of leaking under water pipe lines. As disclosed therein, a clamp for the permanent repair of leaking under water pipe lines provides improved sealing quality against high pressures and decreased erosion of submersed pipe lines that are subjected to erosive action of abrasive material such as sand, gravel or silt in motion. The clamp is also designed for easy installation under adverse diving conditions. As stated therein the clamps have excellent sealing capabilities against high pressure by means of solid faced gaskets recessed and compressed in machine grooves leaving only four points of intersection which are overlapped as well as butted one against the other.

A further approach to repair devices for pipes is described in a U.S. Patent of Wells et al., U.S. Pat. No. 4,111,234. The Wells et al. patent discloses a permanent repair clamp for pipes that are adapted to be installed over a single or double ended pipe bell in a range of sizes. The device essentially comprises separately formed opposing clamp sections or body portions of semi-cylindrical formation with peak-leak-proof interface gasketing between the clamp sections and between such sections in the pipe on which the device is installed. A spanning type arcuate connector or connector sections interlock ridgedly and positively with one side of one clamp section and is adjustably connected ridgedly with the same clamp section at approximately the opposite diametrical side thereof whereby the two clamp sections may be effectively and permanently secured in sealing relationship to a leaking pipe.

In addition, a U.S. Patent of Firestone, U.S. Pat. No. 4,889,370 discloses a weld-less pipe repair assembly comprising a cylindrical hub member having a through bore, the hub member being formed in two separable, mating parts for slidably interfitting engagement. A first one of the parts has a longitudinal slot for fitting the part transversely over a pipe in the area of a leak or rupture prior to sliding the second part into engagement with the first part so that the hub member surrounds the pipe. At least one sealing sleeve is designed to fit in the hub bore to seal the space between the pipe and hub member, the sleeve means slid to allow it to fit over the pipe and a locking assembly is provided for urging the sleeve into the hub member and sealing the sleeve against the pipe.

Nothwithstanding the above, it is presently believed that there is a need and a potential commercial market for a split sleeve clamp assembly for repairing a leak in a fluid conducting pipe in accordance with the present invention. There should be a need and a potential market for such devices because the split sleeve clamp assembly is applicable for repairing a leak in a low, medium or high pressure line. Further, the assemblies in accordance with the present invention are relatively small in size and light in weight and may reduce the cost and time to repair a leak. Further, the assemblies in accordance with the present invention have a relatively simple design and are relatively easy to manufacture and at the same time are durable, easy to assemble and install at the sight of a leak. Still further, the assemblies in accordance with the present invention can usually be installed without shutting down a process and can frequently be used when the condition of the pipe has deterioted.

BRIEF SUMMARY OF THE INVENTION

In essence, the present invention contemplates a split sleeve assembly for repairing a leak in a fluid conducting pipe and more particularly to a clamp that engages a pipe and seals off a leak. The split sleeve assembly includes a longitudinally extending body that defines a cylindrically shaped enclosure that extends along a first axis that is parallel with a section of pipe. The enclosure includes two open ends that are sealed off by a pair of glands or gland elements and a pair of split sealing rings. The longitudinally extending body includes upper and lower half sections that are adapted to be clamped together to form a pipe encircling enclosure with open ends that are subsequently closed. The upper and lower sections each include a pair of inwardly projecting C-shaped flanges with the C-shaped flanges in the upper half section aligned with the C-shaped flanges in the lower half section to more closely engage or nearly abut the pipe on each side of a leak. The C-shaped flanges tend to isolate a leak and form hollow chambers between the leak and the open ends. These chambers are then tightly packed with packing material to further isolate the leak. Each of the upper and lower half sections also include a pair of longitudinally extending outwardly projecting parallel flanges with one on each opposite side i.e. outer surfaces of the half sections. These flanges are constructed and arranged to mate with one another, in other words, one of the outwardly projecting in an upper half section is constructed and dimensioned to meet with one of the outwardly projecting flanges in the lower half section. The surfaces of the mating faces of longitudinally extending flanges may be polished to form a seal and may be separated by a gasket that is suitable for a particular application. In some application such as a pipe for relatively high pressure gas, the surfaces may be lapped together to form a tight seal. A pair of split gland elements and a pair of sealing rings for tying the split gland elements together are also provided for sealing the ends of the cylindrically shaped hollow enclosure. The gland elements are split into two halves that are put together to encase a pipe with a relatively tight fit. Each half of each gland element also includes an ear or extension with an opening passing therethrough along its outer periphery. In a preferred embodiment of the invention the opening is U-shaped so that a swivable bolt can be rotated into engagement with the gland element and a lug nut tightened to force a boss into the open end of the enclosure.

The invention will now be described in connection with the accompanying drawings wherein like reference numerals have been used to define like parts.

DESCRIPTION OF THE PREFERRED EMBODIMENTS OF THE INVENTION

Figure 1:
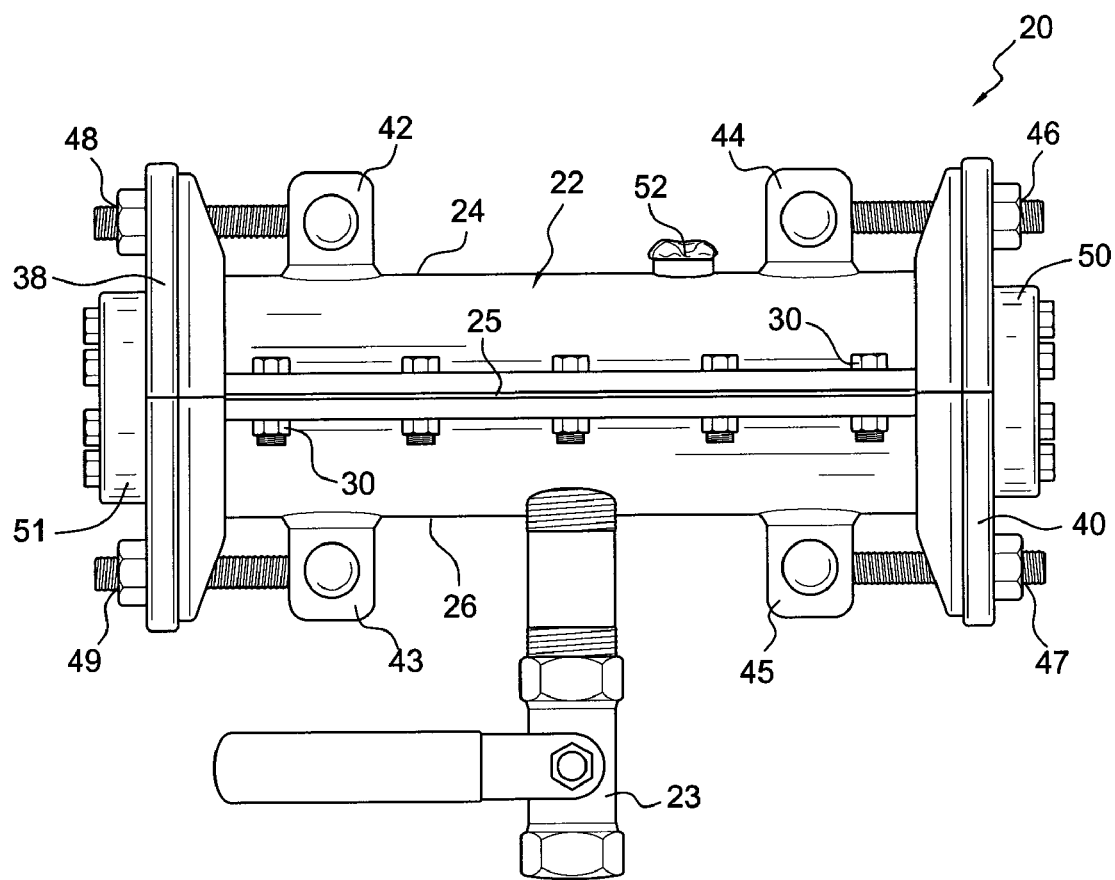
FIG. 1 is a side elevational view of a split sleeve assembly in accordance with a preferred embodiment of the invention.

As shown in FIG. 1, a split sleeve assembly 20 or clamp for repairing a leak in a fluid conducting pipe includes a longitudinally extending body 22 having an upper half section 24 and a lower half section 26 that are placed over and under a pipe as shown. The upper and lower split half sections mate with one another, that is one is aligned with the other and a plurality of bolts 30 fasten the two aligned half sections 24 and 26 together with a longitudinally extending gasket 25 between the two sections.

The upper half section 24 includes a pair of longitudinally and outwardly extending flanges 32 and 34 (See FIG. 2) each of which include a plurality of bore holes 36. The lower half section 26 also includes a pair of longitudinally and outwardly extending flanges 33 and 35 (See FIG. 2) each of which includes a plurality of bore holes 37 that match the bore holes 36 when the upper half section 24 is properly aligned with the lower half section 26.

As shown in FIG. 1, the assembly 20 also includes a pair of gland elements or glands 38 and 40 with one gland element positioned at each end of the longitudinally extending body 22. The gland elements 38 and 40 will be described in more detail in connection with FIGS. 7A and 7B.

As shown in FIG. 1, the upper and lower half sections 24 and 26 each include two pair of brackets with one pair in each end of the respective half section. For example, a first pair of brackets 42 extend upwardly from the upper half section 24 at one end thereof and a second pair of brackets 44 extend upwardly from the opposite end of the upper half section 24. Similarly, a third pair of brackets 43 extend downwardly from one end of the lower half section 26 while a forth pair of brackets 45 extend downwardly from the opposite end of the lower half section 26.

Four pivotal bolts 46, 47, 48 and 49 are rotatably mounted in the brackets 42, 43, 44 and 45 respectively and hold the gland elements 38 and 40 in place. A gland element attachment or sealing ring 50 ties the half sections of the gland element 40 together while a second gland element attaching ring or sealing ring 51 ties the two halves of the gland element 38 together.

Figures 6A, 6B:
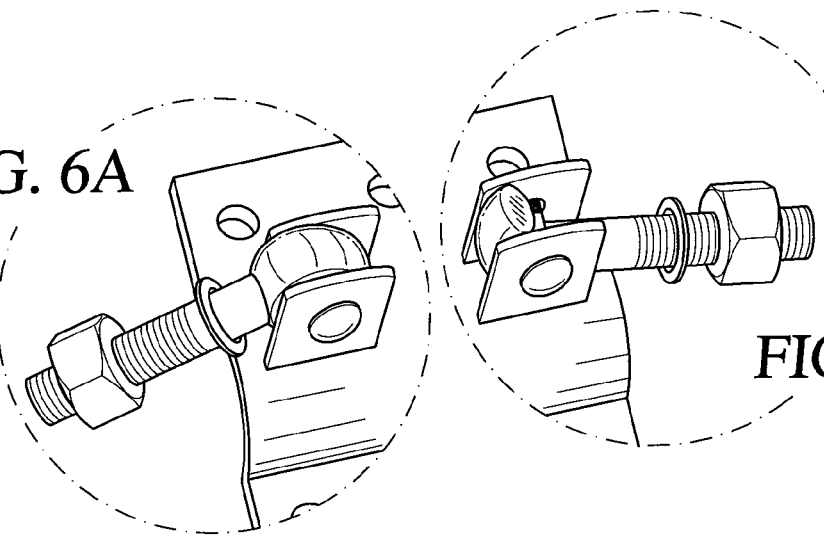
FIG. 6A is a perspective view a swivel bolt as used in one embodiment of the invention.
FIG. 6B is a perspective view of a J-bolt as used in another embodiment of the invention.

The swivel bolts as shown in FIGS. 6A and 6B and may have a generally ring shaped or J-shaped ends.

Figure 2:
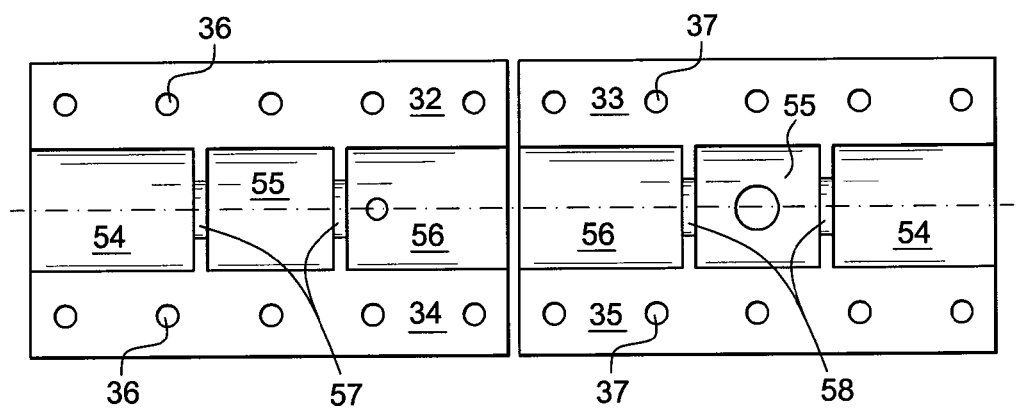
FIG. 2 is a plan view illustrating the C-shaped internal flanges in the split half sections of a main body of a split sleeve assembly in accordance with the present invention.

An injection valve 52 is provided in the upper half section 24 in one embodiment of the invention. The injection valve may be used to install or add packing material to two inner end chambers 54 and 56 (Shown in FIG. 2). As shown in FIG. 2, the body 22 includes a cylindrical chamber that is divided into three chambers by an upper pair of C-shaped flanges 57 and lower pair of C-shaped flanges 58. The C-shaped flanges also define or tend to isolate a central chamber 55 that surrounds a leak in a pipe.

Figure 3:
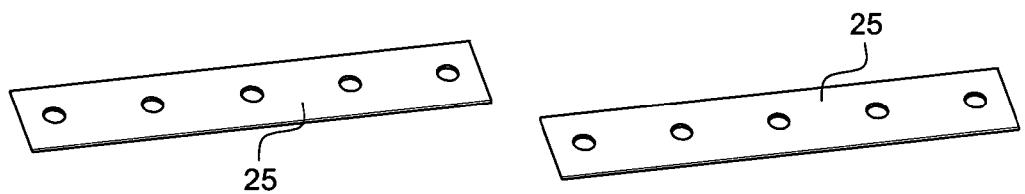
FIG. 3 is a plan view of a pair of side gaskets as used in the present invention
Figure 4:
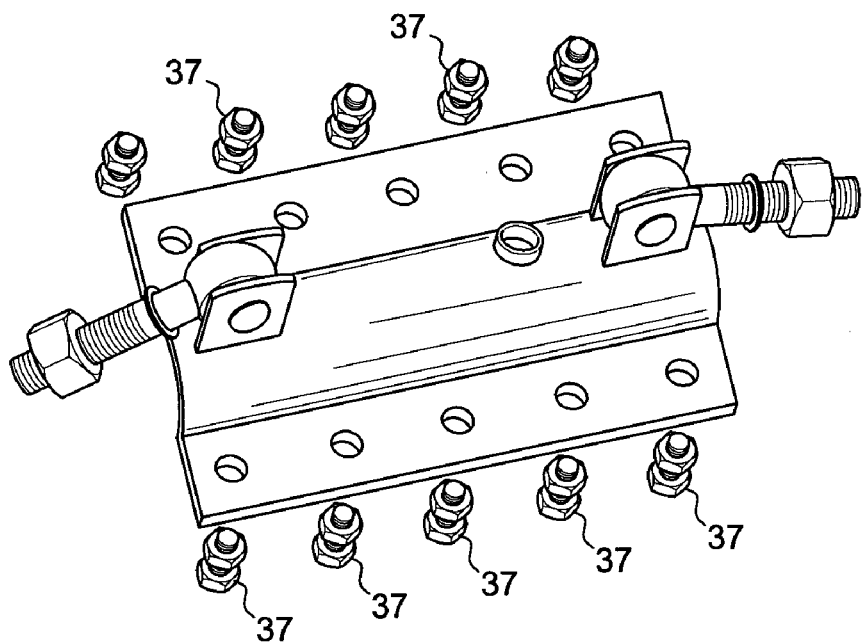
FIG. 4 is a is a top view of an upper split half section of an assembly in accordance with one embodiment of the invention.

Two generally rectangular elongated gaskets 25 (FIG. 3) are placed between the flanges 32 and 35 and between the flanges 33 and 34 to seal the outer edges of the upper and lower half sections when assembled. The flanges are bolted together with 10 bolts 37 (FIG. 4). A draining valve 23 is disposed in a center portion of the lower half section 26.

Figure 5:
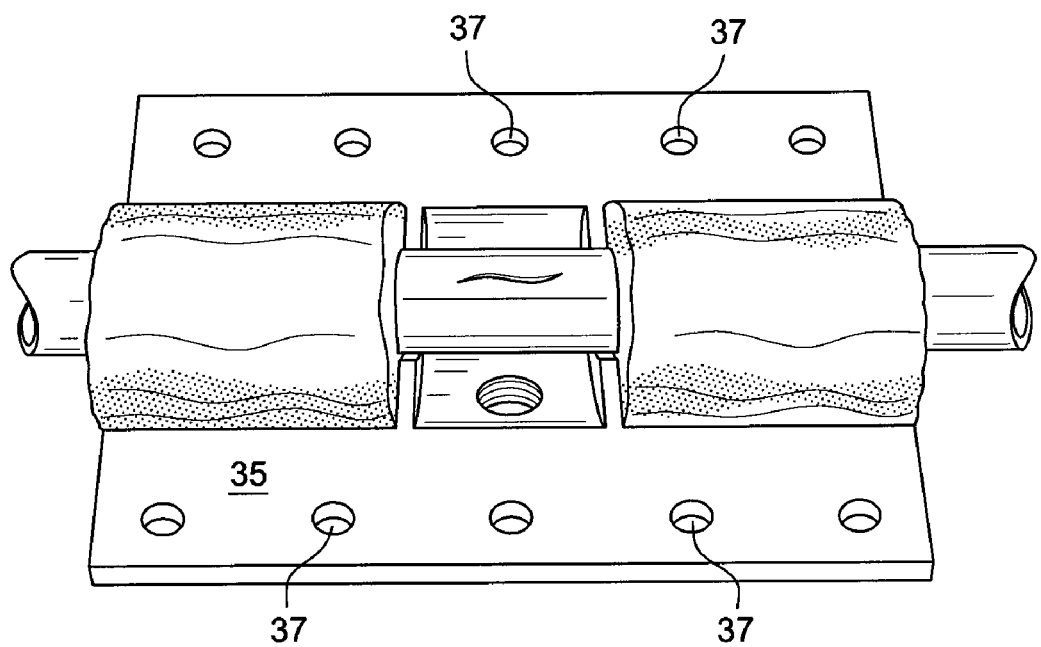
FIG. 5 is a schematic illustration showing the interior of an upper half section with packing material as installed over a leak in a pipe.

FIG. 5 shows a punctured pipe line with an upper half section 24 positioned over the puncture. The central chamber in the section 24 is over the puncture and forms the upper half of the central chamber 55 and as shown free of packing material. However, the inner end chambers 54 and 56 are filled with packing material. In practice the upper and lower half sections will be clamped together with the pairs of C-shaped flanges 57 and 58 and packing material added through the open ends of the inner ends chambers 54 and 56. In the alternative packing material may be added subsequently through the injection valve 52.

Figure 7A:
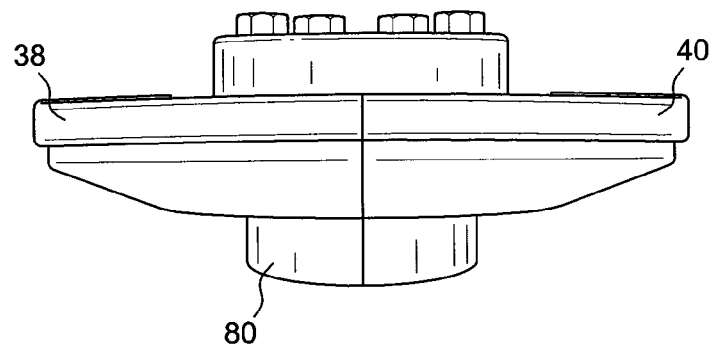
FIG. 7A is a side elevational view of an assembled split gland element as used in a split sleeve assembly in accordance with the present invention.
Figure 7B:
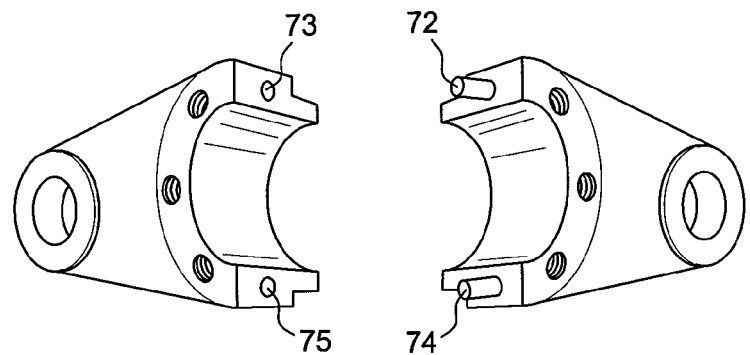
FIG. 7B is a perspective view of an unassembled split gland element shown in FIG. 7A.
Figure 8:
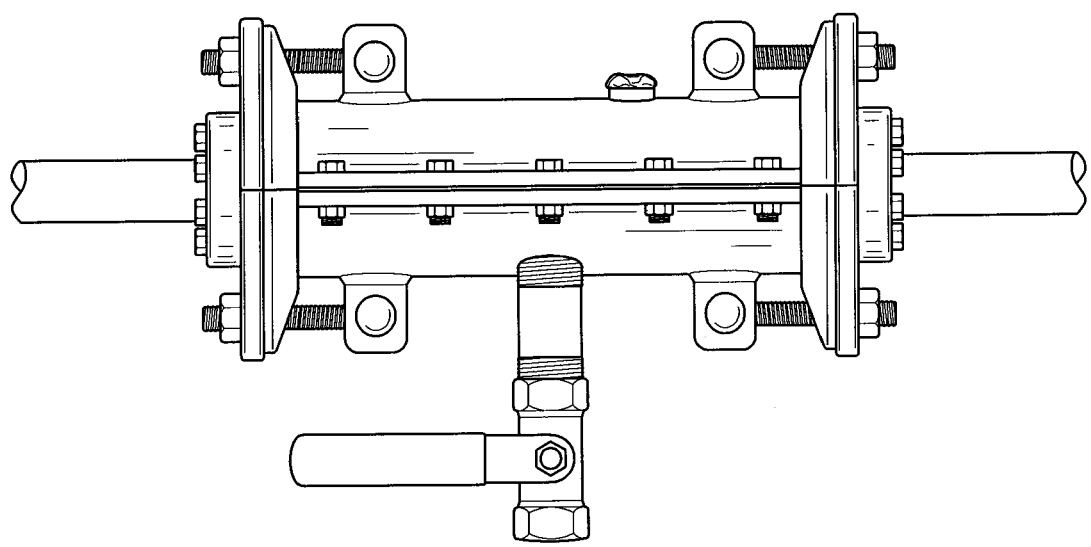
FIG. 8 is a side elevational view of a split sleeve assembly in accordance with the present invention as installed on a pipe.

The end gland elements 38 and 40 are shown in FIGS. 7A and 7B. As shown, each of the gland elements 38 and 40. Each gland element includes an outwardly extending ear with a U-shaped opening or bore hole to receive one end of a swivable bolt 46, 47, 48, or 49 (Shown in FIGS. 1 and 4).

Each gland element 38 and 40 has two portions, a central portion 68 and an outwardly extending element 69 as can be seen in FIG. 7B. The bottom half of the gland element has tow dowel pins 72 and 74 aligned to and adapted to fit into two drilled holes 73 and 75 in the opposite half. The two halves of each gland element are attached together using one of the attaching rings 50 and held thereto by six set screws. Each half of the attaching ring 50 extends across the split between the two halves of the gland element to thereby hold the gland element together. Each of the gland elements also includes a forwardly extending boss 80 that extends into the inner end chamber to push the insulated packing material toward the C-shaped flanges 57 and 58 in the upper and lower half sections. The C-shaped flanges act as a stopper for the inserted packing material. The gland elements and more particularly the boss 80 also close off a cylindrical passage that fits over a pipe that is to be repaired.

In order to repair a leak in a pipe an individual takes an unassembled split sleeve assembly and positions the upper and lower half sections 24 and 26 over the pipe with the leak centered between the two ends of the body 22. In effect one of the pair of C-shaped flanges 57 and a mating C-shaped flange 58 are positioned on each side of the leak and position the upper and lower half sections with respect to the pipe that is being repaired.

One of the gaskets 25 is placed between the longitudinally extending flanges 32 and 33 while the other gasket 25 is placed between the flanges 34 and 35 and the two half sections are bolted together. During these steps the drainage valve 23 is fully open and may include a hose (not shown) to direct any escaping fluid away from the individual that is repairing the pipe. Packing material is forced into the two inner end chambers 54 and 56 to tightly pack the end chambers and the gland elements 38 and 40 are assembled around the pipe and with the bosses 80 forced into the inner end of chambers 54 and 56 to more tightly pack the packing material.

The nuts and washers on the swivel bolts are tightened to pull the gland elements 38 and 40 tightly against the ends of the body 22. Additional packing material may be inserted through the injection valve 52. Then the drainage valve is closed to complete the repair.

While the invention has been described in connection with its preferred embodiments of the invention it should be recognized that changes and modifications may be made therein without departing from the scope of the appended claims.

What is claimed is:

1. A split sleeve assembly for repairing a leak in a fluid conducting pipe, said sleeve assembly comprising:
    a longitudinally extending body defining a cylindrically shaped enclosure extending along a first axis with opposite open ends and including an upper half section and a lower half section connectable together around a pipe;
    each of said half sections including a pair of inwardly projecting spaced apart semi-circular C-shaped flanges with an inner surface in close proximity to the pipe and with the flanges in said upper half section aligned with the flanges in said lower half section and with one of said flanges on each side of a leak to thereby form three hollow chambers with a center chamber and two end chambers with each end chamber between the leak in the pipe and the ends of said enclosure;
    each of said upper and said lower half sections including a pair of outwardly projected longitudinally extending flanges extending along opposite sides of said half sections parallel to said first axis and adapted to mate with the flanges on said other of said half sections;
    a gasket between said longitudinally extending flanges;
    a plurality of bolts and each of said longitudinally extending flanges including a plurality of bolt holes with said bolts passing therethrough to form a fluid tight connection along both sides of said half sections;
    a mass of packing material disposed in each of said two end chambers;
    and wherein said split sleeve assembly includes a pair of two piece gland elements and a pair of split sealing rings with one of said gland elements and one of said two piece sealing rings disposed around the pipe adjacent to said opposite ends of said body, and each pair of said two piece gland elements forming a boss for extending into one of said end chambers for sealing the opposite open ends of each enclosure and for compressing the packing material and each of said half sections including two parallel spaced apart outwardly extending mounting brackets including a bolt hole in each of said brackets;
    a swivable bolt assembly disposed between each pair of mating brackets with an opposite end threaded to receive a nut and where each of said two piece gland elements define a pair of U-shaped openings with one of said openings on an outer periphery of said gland element for receiving a shank of said bolt and a lug nut for drawing said gland element inwardly to tightly engage with an open end of said chamber;
    an injection valve disposed in said upper section for injecting packing material into the chamber between an open end of the body and the leak, and
    a drainage valve for draining fluid out of the space between the C-shaped flanges on opposite sides of the leak in the pipe.

2. A split sleeve assembly according to claim 1 in which said C-shaped flanges are constructed and sized to abut against a pipe and wherein a C-shaped flange in an upper section and a C-shaped flange in a lower section encircle the pipe.

3. A split sleeve assembly according to claim 2 in which said swivable bolt assembly includes a ring shaped head for engaging a bolt extending through said pair of brackets.

4. A split sleeve assembly according to claim 2 in which said swivable bolt assembly includes a J-shaped head for engaging a bolt extending through said pair of brackets.

* * * * *